(12) United States Patent
Purusothaman et al.

(10) Patent No.: US 11,838,180 B2
(45) Date of Patent: Dec. 5, 2023

(54) CLOUD CONNECTOR SYSTEM FOR ESTABLISHING A SECURE CONNECTION BETWEEN CLOUD SERVER AND A TENANT

(71) Applicant: AppViewX Inc., New York, NY (US)

(72) Inventors: Anand Purusothaman, Coimbatore (IN); Sunil Kumar Poozhikunnath Ramakrishnan, Palakkad (IN); Rajesh Kumar Kunnathuvayalil Velayudhan, Kerala (IN); Aishwarya Ramachandran, Coimbatore (IN)

(73) Assignee: APPVIEWX INC., New York, NY (US)

( * ) Notice: Subject to any disclaimer, the term of this patent is extended or adjusted under 35 U.S.C. 154(b) by 0 days.

(21) Appl. No.: 17/962,333

(22) Filed: Oct. 7, 2022

(65) Prior Publication Data
US 2023/0114232 A1    Apr. 13, 2023

Related U.S. Application Data

(60) Provisional application No. 63/253,460, filed on Oct. 7, 2021.

(51) Int. Cl.
*H04L 41/082* (2022.01)
*H04L 67/10* (2022.01)

(52) U.S. Cl.
CPC ............ *H04L 41/082* (2013.01); *H04L 67/10* (2013.01)

(58) Field of Classification Search
CPC ..... H04L 41/082; H04L 67/10; H04L 9/3263; H04L 63/0428; H04L 63/062; H04L 9/0894
See application file for complete search history.

(56) References Cited

U.S. PATENT DOCUMENTS

| | | | |
|---|---|---|---|
| 11,539,582 B1 * | 12/2022 | Gupta | ................ H04L 41/0813 |
| 2021/0067931 A1 * | 3/2021 | Lankalapalli | ......... H04L 67/141 |
| 2021/0073449 A1 * | 3/2021 | Segev | ..................... G06F 30/27 |

* cited by examiner

*Primary Examiner* — El Hadji M Sall (57) ABSTRACT

A computer-implemented method for enabling a cloud connector system (100) to establish a secure connection between on-premise devices and a cloud server (108) hosting a cloud Certificate Lifecycle Management as a Service (CLMaaS) for validating and upgrading a certificate on the on-premise devices is provided. The method includes implementing a plurality of cloud connectors (102A-N) in a tenant premise comprising a plurality of on-premise devices (104A-N) to establish a full-duplex connection between the plurality of on-premise devices and the CLMaaS, performing a runtime analysis of the connection between the cloud server and the plurality of cloud connectors, routing the requests from the cloud CLMaaS to the plurality of on-premise devices through the plurality of cloud connectors based on the run time analysis of the connection, and enabling the cloud connector system to execute the certificate validation and upgradation in the on-premise devices based on the request from the cloud CLMaaS.

18 Claims, 7 Drawing Sheets

502 IMPLEMENTING A PLURALITY OF CLOUD CONNECTORS IN A TENANT PREMISE COMPRISING A PLURALITY OF ON-PREMISE DEVICES TO ESTABLISH A FULL-DUPLEX CONNECTION BETWEEN A PLURALITY OF ON-PREMISE DEVICES AND THE CLOUD CERTIFICATE LIFECYCLE MANAGEMENT AS A SERVICE (CLMAAS) HOSTED ON THE CLOUD SERVER WITH A PLURALITY OF CLOUD CONNECTORS, THE PLURALITY OF CLOUD CONNECTORS ARE CONFIGURED TO ACCEPT REQUESTS RELATED TO CERTIFICATE VALIDATION AND UPGRADATION FROM THE CLOUD CLMAAS THROUGH A CLOUD CONNECTOR PROXY SERVER AND EXECUTE THE REQUESTS IN THE PLURALITY OF ON-PREMISEDEVICES ON BEHALF OF DEVICE COMMUNICATION LAYER OF THE CLOUD CLMAAS, THE PLURALITY OF CLOUD CONNECTORS ARE HOSTED WITH IN A DATACENTER

↓

504 PERFORMING A RUNTIME ANALYSIS OF THE CONNECTION BETWEEN THE CLOUD SERVER AND THE PLURALITY OF CLOUD CONNECTORS, THE RUNTIME ANALYSIS OF THE CONNECTION IS DETERMINED BY THE NUMBER OF REQUESTS RECEIVED PER MINUTE FROM THE CLOUD CLMAAS TO THE PLURALITY OF CLOUD CONNECTORS

↓

506 ROUTING THE REQUESTS FROM THE CLOUD CLMAAS TO THE PLURALITY OF ON-PREMISE DEVICES THROUGH THE PLURALITY OF CLOUD CONNECTORS BASED ON THE RUNTIME ANALYSIS OF THE CONNECTION, DATA CENTER ROUTES THE REQUESTS BETWEEN THE PLURALITY OF CLOUD CONNECTORS WITHIN A DATACENTER BASED ON THE RUNTIME ANALYSIS OF THE CONNECTION

↓

508 ENABLING THE CLOUD CONNECTOR SYSTEM TO EXECUTE THE CERTIFICATE VALIDATION AND UPGRADATION IN THE ON-PREMISE DEVICES BASED ON THE REQUEST FROM THE CLOUD CLMAAS

CLOUD CONNECTOR SYSTEM FOR ESTABLISHING A SECURE CONNECTION BETWEEN CLOUD SERVER AND A TENANT

BACKGROUND

Technical Field

The embodiments herein generally relate to a cloud communication system, and more particularly, to a system and method for establishing a secure connection between a cloud server hosting a cloud Certificate Lifecycle Management as a Service (CLMaaS) and a tenant without a VPN connection or infrastructure configuration.

Description of the Related Art

Consumers and businesses are increasingly demanding the ability to access computer network resources from different locations. Usage scenarios include at least one employee access to corporate networks, supplier access to customer networks, student access to school networks, or others.

Traditionally, access has been provided using dial-up telephone-based connections directly between an end-user and a remote network. A large number of advantages of using Internet-based connections, Virtual Private Networks (VPNs) are implemented to meet these needs. The VPNs make use of encryption technologies to privately and securely transport sensitive data across a public Internet. Common VPN implementations enable a remote user to access, via a web browser, a very limited subset of resources on a cloud network such as intranet documents (internal websites), access to email in a restricted form, and occasionally access to files stored on network file servers.

Existing VPN implementations are subject to severe limitations in their usability. In particular, they are all restricted in the types of functionalities they can provide by the intrinsic capabilities of common web browsers and by the facilities of the Hypertext Transfer Protocol (HTTP). Only very basic file transferring, the display of websites, and the use of applications specifically designed to run within the constraints of Web technology is achieved.

Accordingly, there remains a need for a system and method for providing a secure channel for network connectivity.

SUMMARY

In view of the foregoing, an embodiment herein provides a method of enabling a cloud connector system to establish a secure connection between on-premise devices and a cloud server hosting a cloud Certificate Lifecycle Management as a Service (CLMaaS) for validating and upgrading a certificate on the on-premise devices. The method includes implementing, a plurality of cloud connectors in a tenant premise comprising a plurality of on-premise devices to establish a full-duplex connection between the plurality of on-premise devices and the cloud Certificate Lifecycle Management as a Service (CLMaaS) hosted on the cloud server with a plurality of cloud connectors. The plurality of cloud connectors are configured to accept requests related to certificate validation and upgradation from the cloud CLMaaS through a cloud connector proxy server and execute the requests in the plurality of on-premise devices on behalf of device communication layer of the cloud CLMaaS. The plurality of cloud connectors are hosted with in a datacenter.

The method includes performing a runtime analysis of the connection between the cloud server and the plurality of cloud connectors. The run time analysis is performed based on the number of requests received per minute from the cloud CLMaaS to the plurality of cloud connectors. The method includes routing the requests from the cloud CLMaaS to the plurality of on-premise devices through the plurality of cloud connectors based on the runtime analysis of the connection. The data center routes the requests between the plurality of cloud connectors within a datacenter based on the runtime analysis of the connection. The method includes enabling the cloud connector system to execute the certificate validation and upgradation in the on-premise devices based on the request from the cloud CLMaaS.

In some embodiments, the cloud connector system routes the requests between the plurality of cloud connectors within the data center.

In some embodiments, the device communication layer communicates through common libraries comprising at least one of SSH connector, REST connector, SFTP connector, Email Connector.

In some embodiments, the cloud connector proxy accepts requests from the device communication layer and routes the requests to the plurality of cloud connectors.

In some embodiments, the plurality of cloud connectors employs mTLS and AES256 authentication to communicate with the plurality of on-premise devices and the cloud server.

In some embodiments, the plurality of cloud connectors run in an internal network of the plurality of on-premise devices.

In some embodiments, each of the cloud connector comprises a dedicated channel for communication with each of the on-premise devices.

In some embodiments, the runtime analysis of the connection provides a health status of the connection indicated as (i) "good" when the number of requests is >=9 out of 10, (ii) "poor" when the number of requests is >=1 out of 10, (iii) "failed" when the number of requests is 0 out of 10. The health status of the plurality of cloud connectors are indicated as color codes.

In some embodiments, the method includes passing previously managed certificates in the cloud CLMaaS to the plurality of on-premise devices through the plurality of cloud connectors based on the runtime analysis of the connection.

In another aspect, a cloud connector system for establishing a secure connection between on-premise devices and a cloud server hosting a cloud Certificate Lifecycle Management as a Service (CLMaaS) for validating and upgrading a certificate on the on-premise devices is provided. The system includes a memory unit that stores a database and a set of instructions; and a processor that executes the set of instructions and is configured to: (i) implementing, a plurality of cloud connectors in a tenant premise comprising a plurality of on-premise devices to establish a full-duplex connection between a plurality of on-premise devices and the cloud Certificate Lifecycle Management as a Service (CLMaaS) hosted on the cloud server with a plurality of cloud connectors, the plurality of cloud connectors are configured to accept requests related to certificate validation and upgradation from the cloud CLMaaS through a cloud connector proxy server and execute the requests in the plurality of on-premise devices on behalf of device communication layers of the cloud CLMaaS, the plurality of cloud connectors are hosted with in a datacenter; (ii) performing, a runtime analysis of the connection between the cloud server and the plurality of cloud connectors, the runtime analysis is performed based on the number of requests received per minute from the cloud CLMaaS to the plurality of cloud connectors, (iii) routing, the requests from the cloud CLMaaS to the plurality of on-premise devices through the plurality of cloud connectors based on the runtime analysis of the connection, wherein the data center routes the requests between the plurality of cloud connectors within a datacenter based on the runtime analysis of the connection; and (iv) enabling the cloud connector system to execute the certificate validation and upgradation in the on-premise devices based on the request from the cloud CLMaaS.

In some embodiments, the cloud connector system routes the requests between the plurality of cloud connectors within the data center.

In some embodiments, the device communication layers communicate through common libraries comprising at least one of SSH connector, REST connector, SFTP connector, Email Connector.

In some embodiments, the cloud connector proxy accepts requests from the device communication layers and routes the requests to the plurality of cloud connectors.

In some embodiments, the plurality of cloud connectors employs mTLS and AES256 authentication to communicate with the plurality of on-premise devices and the cloud server.

In some embodiments, the plurality of cloud connectors run in an internal network of the plurality of on-premise devices.

In some embodiments, each of the cloud connector comprises a dedicated channel for communication with each of the on-premise devices.

In some embodiments, the runtime analysis of the connection provides a health status of the connection indicated as (i) "good" when the number of requests is >=9 out of 10, (ii) "poor" when the number of requests is >=1 out of 10, (iii) "failed" when the number of requests is 0 out of 10, wherein the health status of the plurality of cloud connectors are indicated as color codes.

In yet another aspect, a one or more non-transitory computer-readable storage mediums storing the one or more sequences of instructions, which when executed by the one or more processors, causes to perform a method of enabling a cloud connector system to establish a secure connection between on-premise devices and a cloud server hosting a cloud Certificate Lifecycle Management as a Service (CLMaaS) for validating and upgrading a certificate on the on-premise devices, the method comprising: implementing, a plurality of cloud connectors in a tenant premise comprising a plurality of on-premise devices to establish a full-duplex connection between the plurality of on-premise devices and the cloud Certificate Lifecycle Management as a Service (CLMaaS) hosted on the cloud server with a plurality of cloud connectors, the plurality of cloud connectors are configured to accept requests related to certificate validation and upgradation from the cloud CLMaaS through a cloud connector proxy server and execute the requests in the plurality of on-premise devices on behalf of device communication layers of the cloud CLMaaS, the plurality of cloud connectors are hosted with in a datacenter; performing, a runtime analysis of the connection between the cloud server and the plurality of cloud connectors, the runtime analysis is performed based on the number of requests received per minute from the cloud CLMaaS to the plurality of cloud connectors; routing, the requests from the cloud CLMaaS to the plurality of on-premise devices through the plurality of cloud connectors based on the runtime analysis of the connection, the data center routes the requests between the plurality of cloud connectors within a datacenter based on the runtime analysis of the connection; and enabling the cloud connector system to execute the certificate validation and upgradation in the on-premise devices based on the request from the cloud CLMaaS.

The cloud connector system 100 runs in the tenant's internal network and acting as a proxy to securely transmit requests from the cloud server to the organization's critical enterprise infrastructure components. The cloud connector system allows organizations to leverage the benefits of the cloud network's CERT+, together with those of their existing LDAP, Devices, HSM vendors, certificate authority, email, and other internal systems. The cloud connector system includes a self-serviceable, Linux-based lightweight setup or connectivity from the cloud server to internal network systems or devices such as On-premise and SaaS (AD, HSM, ADC, Firewall, Network devices, Internal systems. The cloud connector system is of advantage is that a VPN connection and complex network or infrastructure configurations are not required. The cloud connector system supports onboarding certificates, discovering certificates, performing certificate actions like enrolling, renewing, pushing, reissuing, revoking, reinstating certificates, and managing certificate inventories, reporting and monitoring certificates and managing alerts and logs.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for establishing a secure connection between a cloud server hosting a cloud Certificate Lifecycle Management as a Service (CLMaaS) and a tenant without a VPN connection or infrastructure configuration. Referring now to the drawings, and more particularly to FIGS. 1 through 7, where similar reference characters denote corresponding features consistently throughout the figures, there are shown preferred embodiments.

Figure 1:
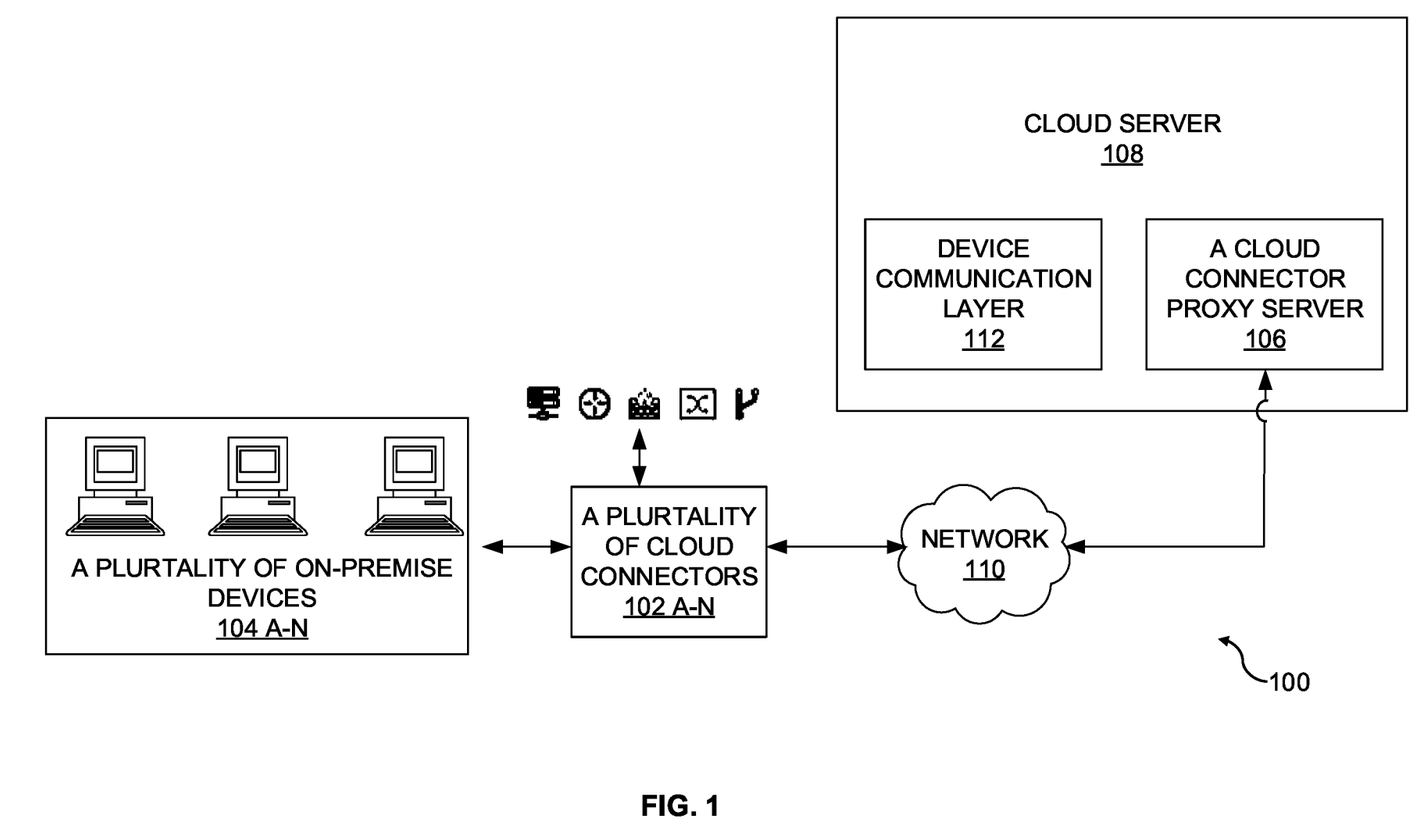
FIG. 1 illustrates a cloud connector system for establishing a secure connection between a cloud server hosting a cloud Certificate Lifecycle Management as a Service (CLMaaS) and a tenant without a VPN connection or infrastructure configuration according to an embodiment herein.

FIG. 1 illustrates a cloud connector system 100 for establishing a secure connection between on-premise devices and a cloud server hosting a cloud Certificate Lifecycle Management as a Service (CLMaaS) for validating and upgrading a certificate on the on-premise devices according to an embodiment herein. The cloud connector system 100 includes a plurality of cloud connectors 102A-N, a plurality of on-premise devices 104A-N, a cloud proxy server 106 and a cloud server 108, a network 110 and a device communication layer 112. The cloud connector system 100 may be an application that is installed on a private network on a tenant premise. The cloud connector system 100 implements a plurality of cloud connectors in a tenant premise comprising a plurality of on-premise devices to establish a full-duplex connection between a plurality of on-premise devices 104A-N and the cloud Certificate Lifecycle Management as a Service (CLMaaS) hosted on the cloud server 108 with a plurality of cloud connectors 102A-N. The plurality of cloud connectors 102A-N are configured to accept requests related to certificate validation and upgradation from the cloud CLMaaS through the cloud connector proxy server 108 and execute the requests in the plurality of on-premise devices 104A-N on behalf of the device communication layer 112 of the cloud CLMaaS. The plurality of cloud connectors are hosted with in a datacenter. The cloud connector system 100 performs a runtime analysis of the connection between the cloud server 108 and the plurality of cloud connectors 102A-N. The runtime of the connection is based on the number of requests received per minute from the cloud CLMaaS to the plurality of cloud connectors 102A-N. The cloud connector system 100 performs routing the requests from the cloud CLMaaS to the plurality of on-premise devices through the plurality of cloud connectors based on the runtime analysis of the connection. The data center routes the requests between the plurality of cloud connectors within a datacenter based on the runtime analysis of the connection. The cloud connector system 100 executes the certificate validation and upgradation in the on-premise devices 104A-N based on the request from the cloud CLMaaS.

The plurality of cloud connectors 102A-N are deployed in the tenant premise to manage all requests received from the CLMaaS. The cloud connector system 100 performs a runtime health analysis of CLMaaS connection for in-time troubleshooting in the event of a failure. In some embodiments, for new devices without any certificates, the cloud connector system 100 pushes certificates that are already being managed by an application to the new devices using a software application that runs on the cloud server 108. The firewall is to be disabled in the plurality of on-premise devices 104A-N where the plurality of cloud connectors 102A-N is to be installed. In some embodiments, to check the current status of the firewall, the following command is executed: "sudo systemctl status firewall". In some embodiments, to temporarily disable the firewall, the following command is executed: "sudo systemctl stop firewall". In some embodiments, to permanently disable the firewall, the following command is executed: "sudo systemctl disable firewall". The cloud connector proxy server 106 facilitates the communication between the cloud server 108 and the plurality of cloud connectors 102A-N. In some embodiments, the cloud connector proxy server 106 employs a websocket protocol that takes requests from the device communication layer 112 and routes them to the plurality of cloud connectors 102A-N. The communication between the plurality of cloud connectors 102A-N and the cloud connector proxy server 106 is via the websocket protocol. Each of the plurality of cloud connectors 102A-N is a websocket consumer endpoint, that listens for any request received by the cloud connector proxy server 106 from the device communication layer 112. The device communication layer 112 may communicate through common libraries comprising at least one of SSH connector, REST connector, SFTP connector, Email Connector. In a SaaS (Software-as-a-service) model, all calls happening through a common library are dynamically routed to the plurality of cloud connectors 102A-N for execution using the aspects mechanism. If the device communication layer 112 communicates to the plurality of on-premise devices 104A-N through the standard connector library, then there is a custom logic written to route a call as part of a SaaS framework. If the device communication layer 112 uses any other mechanism to communicate with the plurality of on-premise devices 104A-N, unless the dynamic routing logic is written explicitly, the communication fails. In some embodiments, the call is routed to the plurality of cloud connectors 102A-N using aspects written around the plurality of cloud connectors 102A-N initiated from the device communication layer 112. These aspects are added to the device communication layer 112 at runtime. In some embodiments, all standard protocols that are required to communicate with the plurality of cloud connectors 102A-N such as REST, SSH, SFTP calls are routed to the plurality of cloud connectors 102A-N using aspects added to the device communication layer 112 at start-up.

The plurality of cloud connectors 102A-N are tagged based on datacenters. One cloud connector is sufficient to handle all cloud network operations seamlessly and more cloud connectors may be added by the user if required. The tasks or traffic load is split randomly amongst the plurality of cloud connectors 102A-N within one datacenter. when one cloud connector is failed, the tasks or traffic are routed through the rest of the cloud connectors based on the runtime analysis of the connection. The runtime analysis of the connection provides a health status of the plurality of cloud connectors 102A-N which is determined by a number of traffic pulses or heartbeats receives per minute from the cloud CLMaaS to the plurality of cloud connectors. A color-coded health indicator is displayed for the plurality of cloud connectors 102A-N, for example: The number of pulses is >=9 out of 10, then the color-coded health indicator is displayed as green " ▧ ". The green color-coded health indicator shows that the health status of the plurality of cloud connectors 102A-N is good. The number of pulses is >=1 out of 10, then the color-coded health indicator is displayed as amber "▨". The amber color-coded health indicator shows that the health status of the plurality of cloud connectors 102A-N is poor and needs to be checked. The number of pulses is 0 out of 10, then the color-coded health indicator is displayed as red "▨". The red color-coded health indicator shows that the health status of the plurality of cloud connectors 102A-N is not working. The health status of the plurality of cloud connectors 102A-N is forwarded to the cloud server 108 from a docker container with Docker IP. To enable forwarding of the health status of the plurality of cloud connectors 102A-N to the cloud server 108 IP forwarding needs to be enabled on the node where the plurality of cloud connectors 102A-N are installed.

The plurality of cloud connectors 102A-N routes the traffic from and to the cloud server 108 by hosting within a data center. In some embodiments, the traffic is routed within a data center when the traffic is less. The traffic is routed between the data centers when the traffic is high. In some embodiments, the tenant premise includes a demilitarized data center (DMZ) with at least one dedicated cloud connector deployed with a user request for providing a highly secure data center. The highly secure data center may route the traffic within the highly secure data center. The cloud connector system 100 backups and restores the traffic using the plurality of cloud connectors 102A-N. The cloud connector system 100 provides the certificate to the plurality of cloud connectors 102A-N using a software application that runs on the cloud server 108 for CLMaaS connection. In some embodiments, the cloud connector system 100 includes a dedicated generic topic for initiating the communication.

Figure 2:
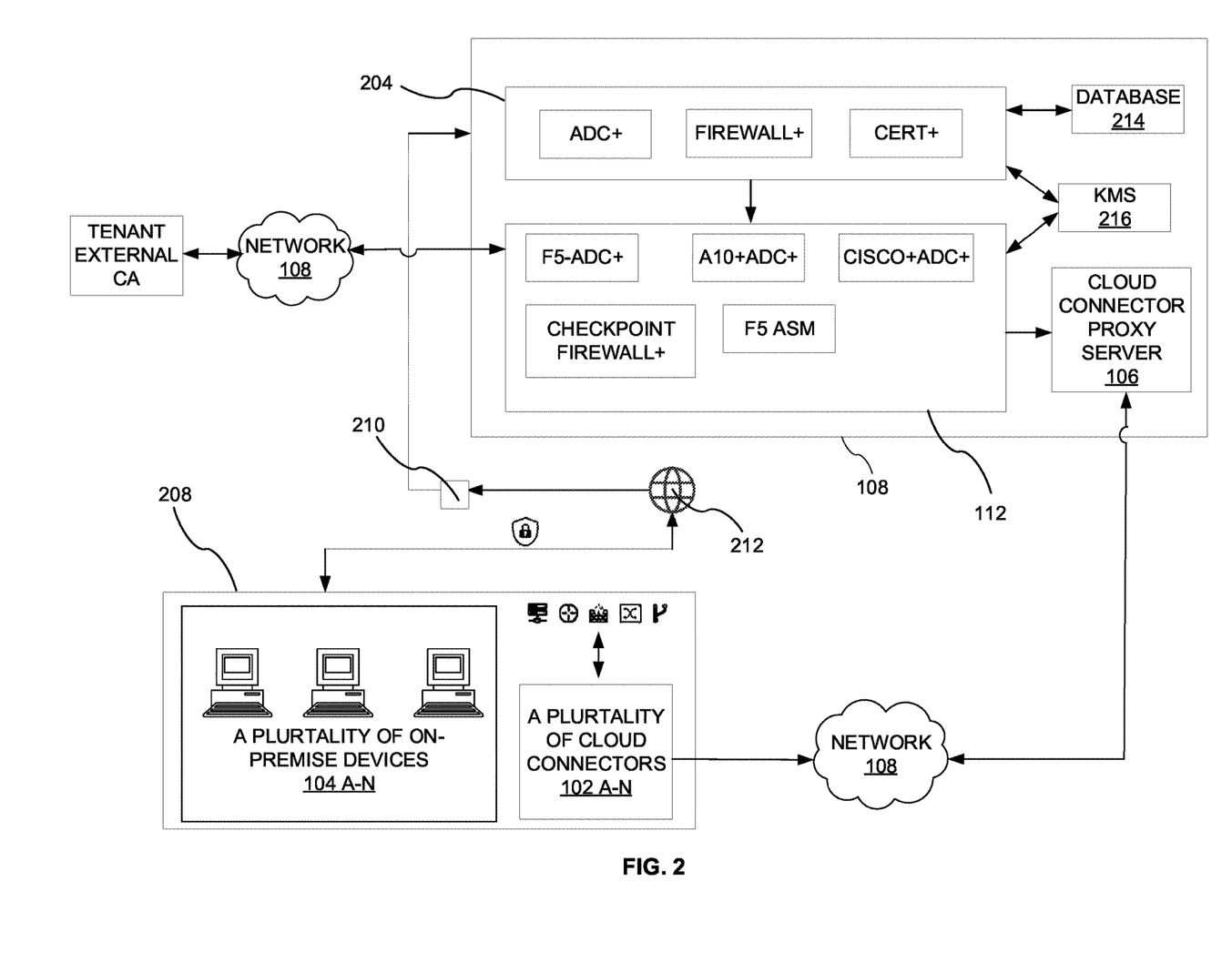
FIG. 2 illustrates an architecture diagram of a single-tenant CLMaaS deployment using the cloud connector system of FIG. 1 according to an embodiment herein.

FIG. 2 illustrates an architecture diagram of a single-tenant CLMaaS deployment using the cloud connector system 100 of FIG. 1 according to an embodiment herein. The CLMaaS is hosted in the cloud server 108 and the communication to the plurality of on-premise devices 104A-N is routed through the plurality of cloud connectors 102A-N. The cloud server 108 includes a business logic layer 204 and the device communication layer 112. The plurality of cloud connectors 102A-N are deployed in the tenant premise 208 to route all the requests from the CLMaaS through the cloud connector proxy server 106 and execute them in the plurality of on-premise devices 104A-N on behalf of the device communication layer 112. The cloud connector system 100 is the endpoint that initiates a full duplex channel for connection to and communication with the cloud server 108. Requests from the plurality of cloud connectors 102A-N are communicated to the cloud server 108 either through the REST API Gateway 210 or through a User Interface 212 having a Web application firewall. The business logic layer 204 manages communication between the end user interface 212 and a database 214. The business logic layer 204 includes workflows responsible for implementing certificate validation and upgradation. The business logic layer 204 interacts with the device communication layer 112. The device communication layer 112 communicates through common libraries comprising at least one of SSH connector, REST connector, SFTP connector, Email Connector. The plurality of cloud connectors 102A-N employs mTLS and AES256 authentication to communicate with the plurality of on-premise devices 104A-N and the cloud server 108. The cloud connector system 100 includes a Cloud KMS 216 which is a REST API that encrypts, decrypts, or signs data for storage in the database 214. In some embodiments, the cloud connector proxy server 106 acts as a broker between CLMaaS and the plurality of cloud connectors 102A-N and routes all device-level operations to the tenant premise 208 via a SaaS Agent. The cloud connector proxy server 108 may listen for SSH, SFTP & HTTP connections from the device communication layer 112. In some embodiments, the cloud connector proxy server 106 receives outgoing calls from the device communication layer 112 and pushes them to a request queue. The SaaS agent may poll the request queue for requests and once a request is received by the agent, the operation is executed in the plurality of on-premise devices 104A-N and the response is pushed back to another queue in the cloud server 108. The cloud connector proxy server 106 may take the response and hand it over to the device communication layer 112. The cloud connector proxy server 106 holds the connection with the device communication layer 112 and assumes that the device communication layer 112 is establishing a connection with the real device itself. In some embodiments, the command repository includes a provision to connect to the cloud connector proxy server 106. In some embodiments, for visual workflow templates, the cloud connector proxy server 106 is mandatory to use command-repository to execute the commands so that it works seamlessly in the cloud environment.

Figure 3:
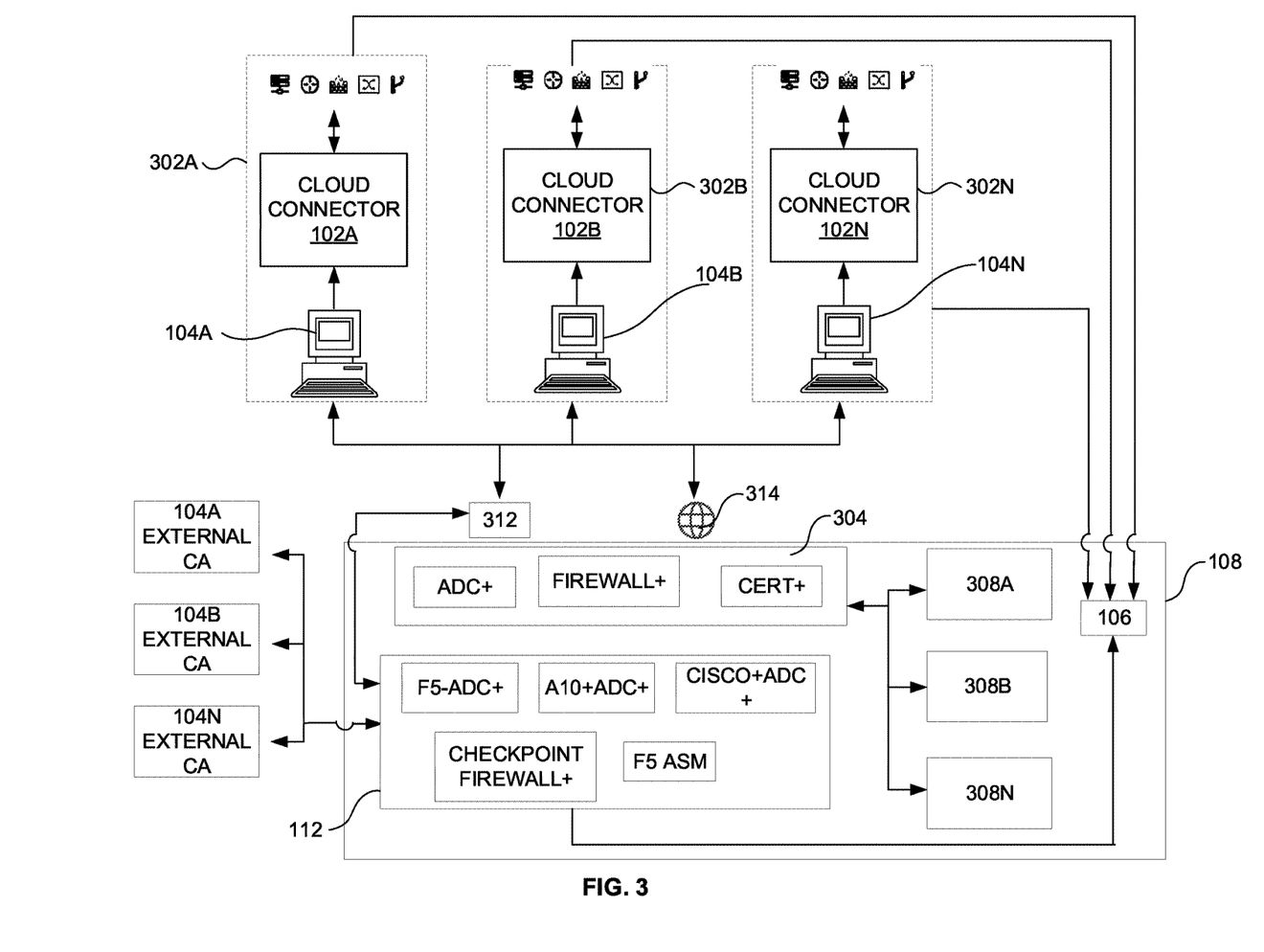
FIG. 3 illustrates an architecture diagram of a multi-tenant CLMaaS deployment using the cloud connector system of FIG. 1 according to an embodiment herein.

FIG. 3 illustrates an architecture diagram of a multi-tenant CLMaaS deployment using the cloud connector system 100 of FIG. 1 according to an embodiment herein. The cloud connector system 100 supports multi-tenancy by providing a dedicated channel for communication per cloud connector and per user device. The isolation happens in the database layer. Each of the plurality of on-premise devices 104A-N includes a dedicated database. The on-premise device 104A includes a database 308A, the on-premise device 104B includes a database 308B, and the on-premise device 104N includes a database 308N. The CLMaaS is hosted in the cloud server 108 and the communication to the plurality of on-premise devices 104A-N is routed through the plurality of cloud connectors 102A-N. The cloud server 108 includes a business logic layer 304 and the device communication layer 112. The cloud connector 102A is deployed in a tenant premise 302A, the cloud connector 102B is deployed in a tenant premise 302B, and the cloud connector 102N is deployed in a tenant premise 302N to route all the requests from the cloud CLMaaS through the plurality of cloud connectors 102A-N through the cloud connector proxy server 106 and execute them in the plurality of on-premise devices 104A-N on behalf of the device communication layer 112. Requests from the plurality of cloud connectors 102A-N are communicated to the cloud server 108 either through the REST API Gateway 312 or through a User Interface 314 having a Web application firewall. The business logic layer 304 manages communication between the user interface 212 and the databases 308A-N of the plurality of on-premise devices 104A-N. The business logic layer 304 includes workflows responsible for implementing certificate validation and upgradation. The business logic layer 304 interacts with the device communication layer 112. The device communication layer 112 communicates through common libraries comprising at least one of SSH connector, REST connector, SFTP connector, Email Connector. The plurality of cloud connectors 102A-N employs mTLS and AES256 authentication to communicate with the plurality of on-premise devices 104A-N and the cloud server 108. The cloud connector proxy server 106 acts as a broker between CLMaaS and the plurality of cloud connectors 102A-N and routes all device-level operations to the tenant premise via a SaaS Agent. The cloud connector proxy server 106 may listen for SSH, SFTP & HTTP connections from the device communication layer 112.

Figure 4:
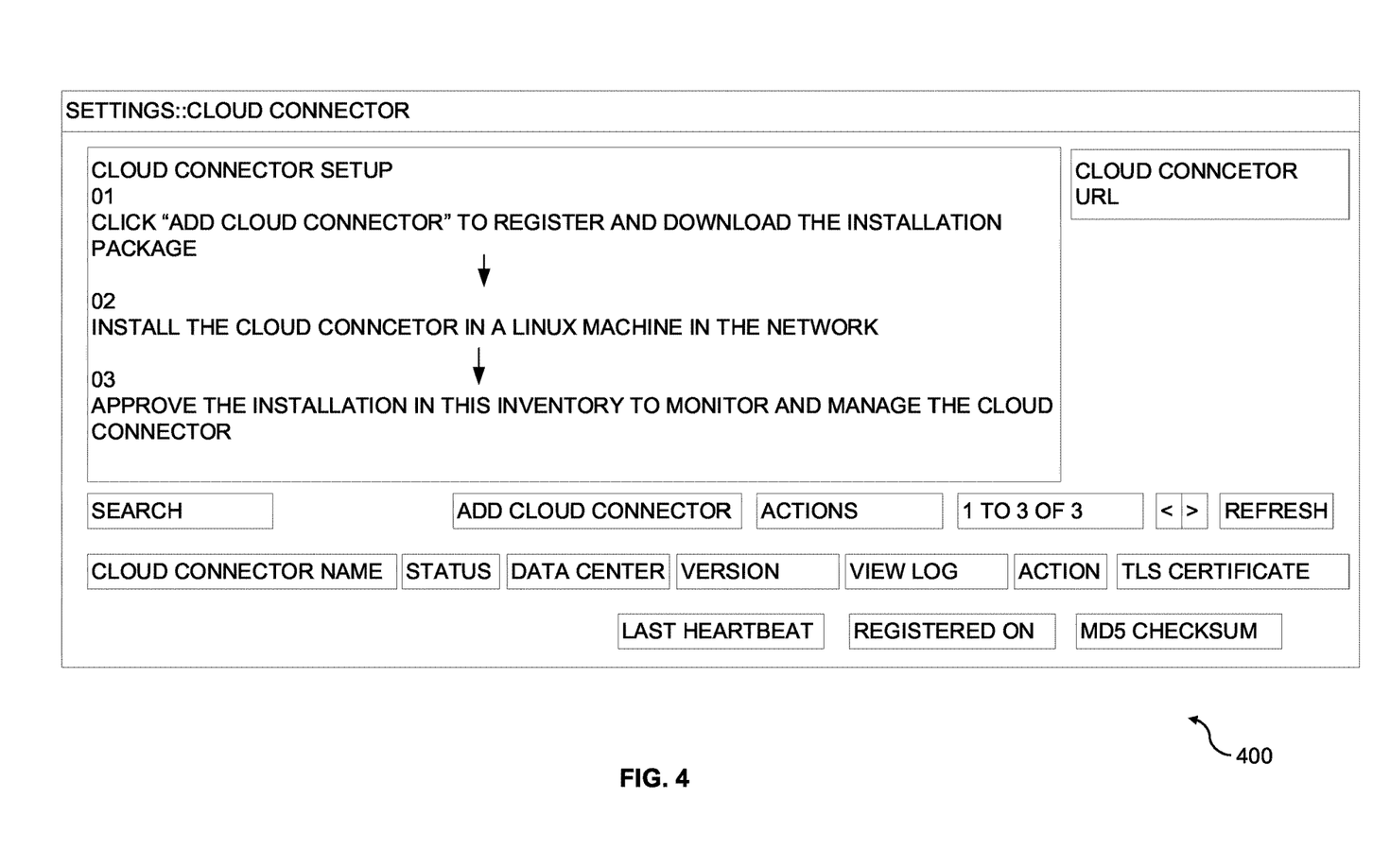
FIG. 4 illustrates a user interface showing inventory details of the plurality of cloud connectors of the cloud connector system of FIG. 1 according to an embodiment herein.

FIG. 4 illustrates a user interface showing inventory details of the plurality of cloud connectors 102A-N of the cloud connector system 100 of FIG. 1 according to an embodiment herein. The user interface 400 includes a "cloud connector setup" field that summarizes the process of setting up the plurality of cloud connectors 102A-N, Cloud Connection URL which is a cloud URL of the websocket server that hosts the instance of the plurality of cloud connectors 102A-N. The user interface 400 includes a "search" field to search for a Cloud Connector entry. In the Search field, the value to filter the records can be entered. The user interface is updated to show details of only those records that match the search criteria. The user interface 400 includes "Add Cloud Connector" field to add a cloud connector, an action field that is enabled only when one or multiple cloud connectors are selected. The actions include start, pause, upgrade, update configuration and the actions can be performed by clicking the action field. The user interface 400 includes a "record count" field that shows the record count preference for easier viewing of records. The user can set the record count preference, which is the number of CC records that will be displayed on one page. The user interface 400 is updated according to the record count preference selected and a message that shows "Record count preference saved successfully" is displayed. The user interface 400 is also updated to display the current selection. The user interface 400 includes an "auto refresh" field that automatically refreshes the cloud connector inventory details every 5 seconds. Enabling the auto refresh feature gives a real-time status update of the health status of the plurality of cloud connectors 102A-N facilitating timely troubleshooting if it is required. The user interface 400 includes the "cloud connector name" field that shows the name of the cloud connector. The user interface 400 includes a "status" field. The status "Waiting for response" indicates that the installation is pending. The status "Waiting for approval" indicates that the admin's response to the installation is pending. The status "Running" indicates that the plurality of cloud connectors 102A-N has been approved by the admin and is running. The status "Paused" indicates that the plurality of cloud connectors 102A-N is paused when it has to undergo maintenance and/or troubleshooting. The user interface 400 includes a "data center" field which is the Physical location where the cloud connector system 100 is hosted. The user interface 400 includes a "version" field that shows the version of the cloud connector platform component. If a new version of the cloud connector platform component is available, the upgrade button is displayed for that cloud connector. The user interface 400 includes "view log" field to view the activity log for the plurality of cloud connectors 102A-N. The user interface 400 includes an "action" field. The action field allows the user to perform (i) pausing a running cloud connector, (ii) starting a paused cloud connector, (iii) approving a cloud connector, (iv) rejecting a cloud connector. The action field displays an action that can be performed for the plurality of cloud connectors 102A-N, depending on the current status of the plurality of cloud connectors 102A-N. The user interface 400 includes a "TLS Certificate" field. If a custom TLS certificate has been uploaded at the time of adding a cloud connector, this field displays the common name and other details for example, the validity of the custom TLS certificate. The user interface 400 includes "Last Heartbeat" field showing the timestamp of the latest health analysis of the plurality of cloud connectors 102A-N. The plurality of cloud connectors 102A-N heartbeat per minute indicates its health status. The optimum value is 10 heartbeats per minute. The user interface 400 includes "Registered On" field that shows the Timestamp of the cloud connector installation. The user interface 400 includes "MD5 Checksum" field that shows the details of the MD5 token. The MD5 token ensures that the downloaded Cloud Connector package is the same as that of the cloud connector system 100 file server.

Figure 5:
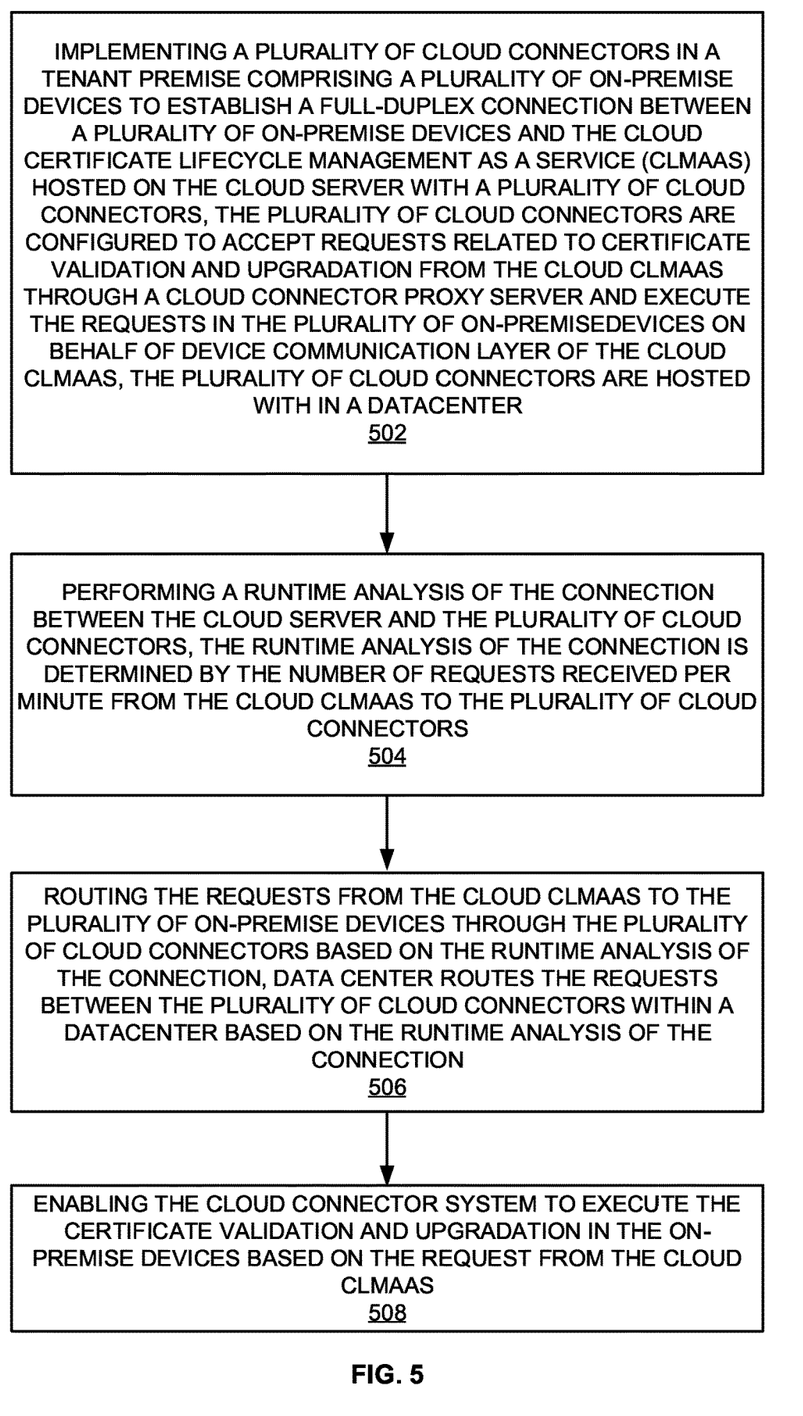
FIG. 5 is a flow diagram illustrating a method of establishing a secure connection between a cloud server hosting a cloud Certificate Lifecycle Management as a Service (CLMaaS) and a tenant without a VPN connection or infrastructure configuration using a cloud connector system according to an embodiment herein.

FIG. 5 is a flow diagram illustrating a method of enabling a cloud connector system 100 to establish a secure connection between on-premise devices and a cloud server hosting a cloud Certificate Lifecycle Management as a Service (CLMaaS) for validating and upgrading a certificate on the on-premise devices according to an embodiment herein. At step 502, the method includes implementing a plurality of cloud connectors in a tenant premise comprising a plurality of on-premise devices to establish a full-duplex connection between a plurality of on-premise devices and the cloud Certificate Lifecycle Management as a Service (CLMaaS) hosted on the cloud server with a plurality of cloud connectors, the plurality of cloud connectors are configured to accept requests related to certificate validation and upgradation from the cloud CLMaaS through a cloud connector proxy server and execute the requests in the plurality of on-premise devices on behalf of device communication layer of the cloud CLMaaS, the plurality of cloud connectors are hosted with in a datacenter. At step 504, the method includes performing, a runtime analysis of the connection between the cloud server and the plurality of cloud connectors, the runtime analysis of the connection is determined by the number of requests received per minute from the cloud CLMaaS to the plurality of cloud connectors. At step 506, the method includes routing the requests from the cloud CLMaaS to the plurality of on-premise devices through the plurality of cloud connectors based on the runtime analysis of the connection, data center routes the requests between the plurality of cloud connectors within a datacenter based on the runtime analysis of the connection. At step 508, the method includes enabling the cloud connector system to execute the certificate validation and upgradation in the on-premise devices based on the request from the cloud CLMaaS.

The cloud connector system 100 is installed by registering and downloading a cloud connector installer. In some embodiments, a single node for installation of the cloud connector system 100 requires (i) at least one of x86 64 bit or 8vCPU, 8 GB RAM 32 GB disk space and (ii) at least one of Linux Red Hat 6 and above, Ubuntu 18 and above, CentOS 7 and above, (iii) Docker version 19 or above installed with non-sudo access, (iv) Bash shell support in the node for the installation of the Cloud Connector Connectivity Service. The OS/Network/Firewall Rule Requirements include (i) Constant hostname for the LINUX machine where the Cloud Connector Connectivity Service is installed, (ii) SSH shell access to the environment for troubleshooting (only by tenant), (iii) Cloud Connector access to tenant network/data center, (iv) Access to the cloud environment (websocket broker and gateway access). Exclusions are added to the tenant firewall for the Cloud URL if the Firewall SSL Offload (SSL inspection) feature is turned on in the tenant's firewall. The cloud connector system 100 is registered in the cloud server 108 by providing basic details about the cloud connector system 100. Post the registration, installation is carried. Each installation is treated as a separate instance and needs a separate registration in the cloud server 108. Once the cloud connector system 100 is installed, a token is generated to complete the registration process. In some embodiment, a script may be executed to test the compliance of a tenant node to the Cloud Connector system 100 installation prerequisites. The plurality of cloud connectors 102A-N authenticates and encrypts all communication between the cloud server 108 and the plurality of on-premise devices 104A-N. Once installed, the plurality of cloud connectors 102A-N establishes communication with the cloud server 108 through an outbound connection. The process of deploying the cloud connector system involves the following three steps: (i) Registering and downloading the cloud connector installer, (ii) Installing the plurality of cloud connectors 102A-N on a Linux machine and (iii) Approving/Rejecting the plurality of cloud connectors 102A-N agent installation. An installer creation is required for setting up each of the plurality of cloud connectors 102A-N. The installer creation requires the cloud connector name that includes the hostname of the machine where the cloud connector is to be installed, the name of the data center where the cloud connector is to be installed and TLS Authentication. For TLS authentication, a TLS certificate may be auto-generated or a custom TLS certificate may be uploaded. A unique key for the Cloud Connector installation is generated. On successful verification of the prerequisites, the secret key may be entered. On entering the Secret Key, the installation will proceed. The Cloud Connector system 100 may comprise the starter plugin and a platform component. The starter plugin component is installed along with the plurality of cloud connectors 102A-N, in the same installation process. When installed, the starter plugin is used to initiate the download of the platform component. The platform component is used to host business use cases related to the cloud connector system 100. When the platform component download is in progress, it is indicated by the  symbol prefixed to the platform component version number in the Cloud Connector inventory details  A completed download/upgrade is indicated by the  symbol in the same location  After the plurality of cloud connectors 102A-N are successfully installed on the Linux machine, an admin user may approve or reject the installation. If the installation has been approved, the plurality of cloud connectors 102A-N is moved to the running state. If the plurality of cloud connectors 102A-N has been rejected, the details of the plurality of cloud connectors 102A-N are removed from the inventory.

After the admin user has approved the installation of the cloud connector system 100, the user is required to 'start' the cloud connector to enable the plurality of cloud connectors 102A-N to route traffic between the plurality of user devices 104A-N and the cloud server 108. To start the plurality of cloud connectors 102A-N, the user is required to select "start" from the action field and the status is set to running. The cloud connector may be paused for regular maintenance or troubleshooting. Pausing a cloud connector will pause all activities that have to be performed in the tenant premise, for example, discovering and scanning certificates, accessing endpoints within the users' network, and so on. To pause the plurality of cloud connectors 102A-N the user is required to select "pause" from the action field and the status is set to paused. The cloud connector system 100 provides a seamless CI/CD pipeline to capture the cloud connector versioning and upgrades on the release portal. If a new version of the cloud connector component is available, the upgrade field is displayed for that cloud connector. The Cloud Connector version is upgraded, as indicated by the  symbol prefixed to the version number,  The cloud connector may be upgraded from the version field. The cloud connector version is upgraded to the latest available version by triggering the pipeline, as indicated by the  symbol prefixed to the version number,  To check if a new certificate has been pushed to the plurality of cloud connectors 102A-N, cloud connector system 100 let the user scan the selected cloud connector and display the updated details in the cloud connector inventory. The cloud connector instance may have to be deleted in an event of a fault with the system on which the instance is installed or it is a faulty installation. Deleting a Cloud Connector instance without having a backup node will result in traffic blockage. Deleting the Cloud Connector will only delete the data from cloud server 108. To remove the plurality of cloud connectors 102A-N from the plurality of user devices 104A-N, the cloud connector has to be uninstalled. To uninstall the plurality of cloud connectors 102A-N, the user is required to run the uninstall.sh script located in the cloud connector agent's download package. If the plurality of cloud connectors 102A-N is up and running, the health indicators are checked to determine if the traffic to the cloud connector is configured correctly. If the health indicator is amber/red, the user is required to check if the plurality of cloud connectors 102A-N are up and running in the customer's premises. If yes, the connectivity from the plurality of cloud connectors 102A-N to the cloud server 108 is validated.

In some embodiments, an option is provided to regenerate the secret key for the plurality of cloud connectors 102A-N. In some embodiments, each installation package contains the tenantId, agentId, and the network proxy configuration. The hostname and a security token are used as identifier for the plurality of cloud connectors 102A-N. The cloud connector system 100 provides data isolation and integrity, flexible licensing options, encryption of data at rest/in use/in motion, tenant admin module, and deployment in the private or public cloud.

Figure 6:
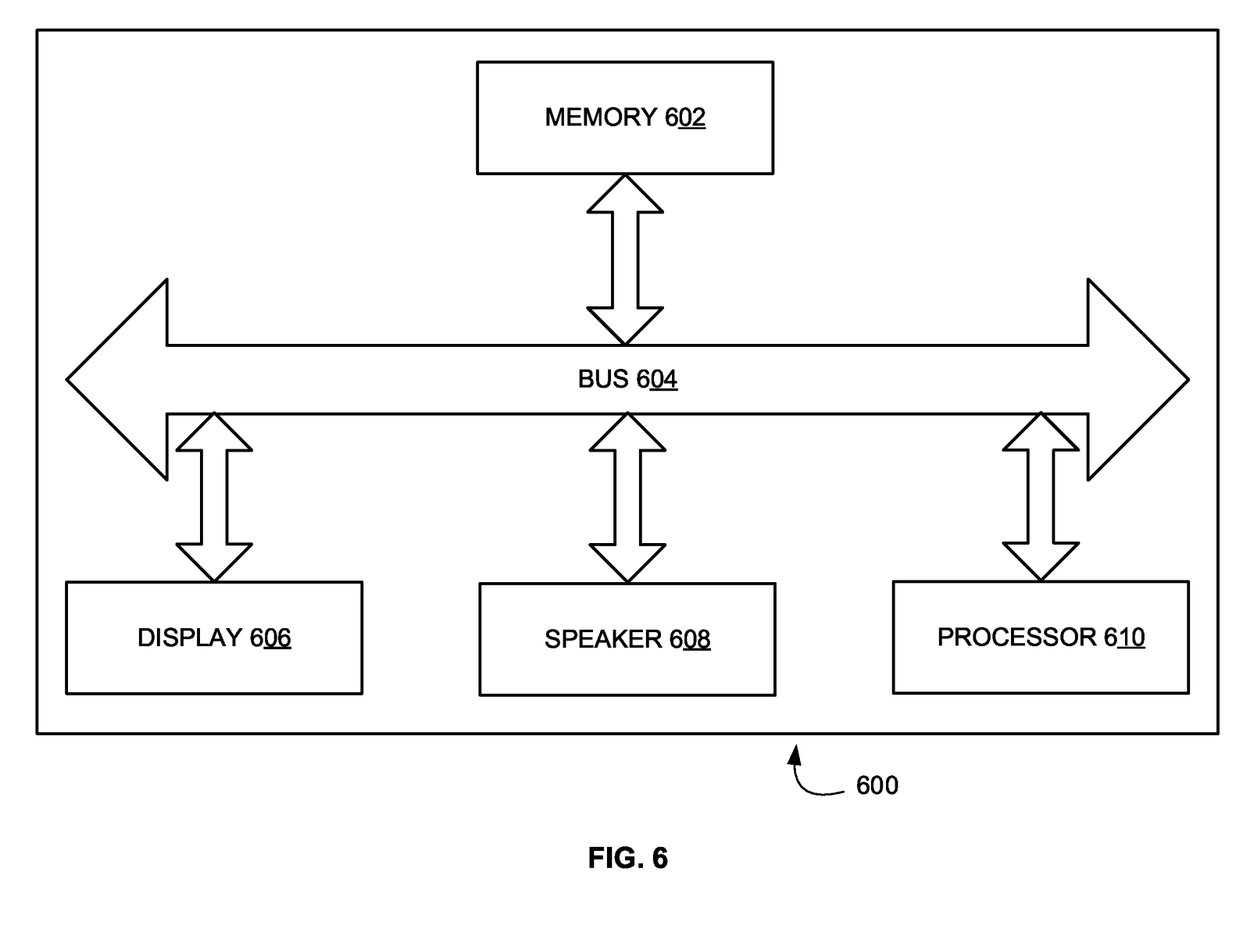
FIG. 6 illustrates an exploded view of a cloud connector system of FIG. 1 according to an embodiment herein.

FIG. 6 illustrates an exploded view of a cloud connector system of FIG. 1 having a memory 602 having a set of instructions, a bus 704, a display 606, a speaker 608, and a processor 610 capable of processing the set of instructions to perform any one or more of the methodologies herein, according to an embodiment herein. The processor 610 may also enable digital content to be consumed in the form of a video for output via one or more displays 606 or audio for output via speaker and/or earphones 608. The processor 610 may also carry out the methods described herein and in accordance with the embodiments herein.

Digital content may also be stored in the memory 602 for future processing or consumption. The memory 602 may also store program-specific information and/or service information (PSI/SI), including information about digital content (e.g., the detected information bits) available in the future or stored from the past. A user of the receiver 600 may view this stored information on display 606 and select an item for viewing, listening, or other uses via input, which may take the form of a keypad, scroll, or another input device (s) or combinations thereof. When digital content is selected, the processor 610 may pass information. The content and PSI/SI may be passed among functions within the receiver using the bus 604.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entire hardware embodiment, an entire software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk—read-only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet cards are just a few of the currently available types of network adapters.

Figure 7:
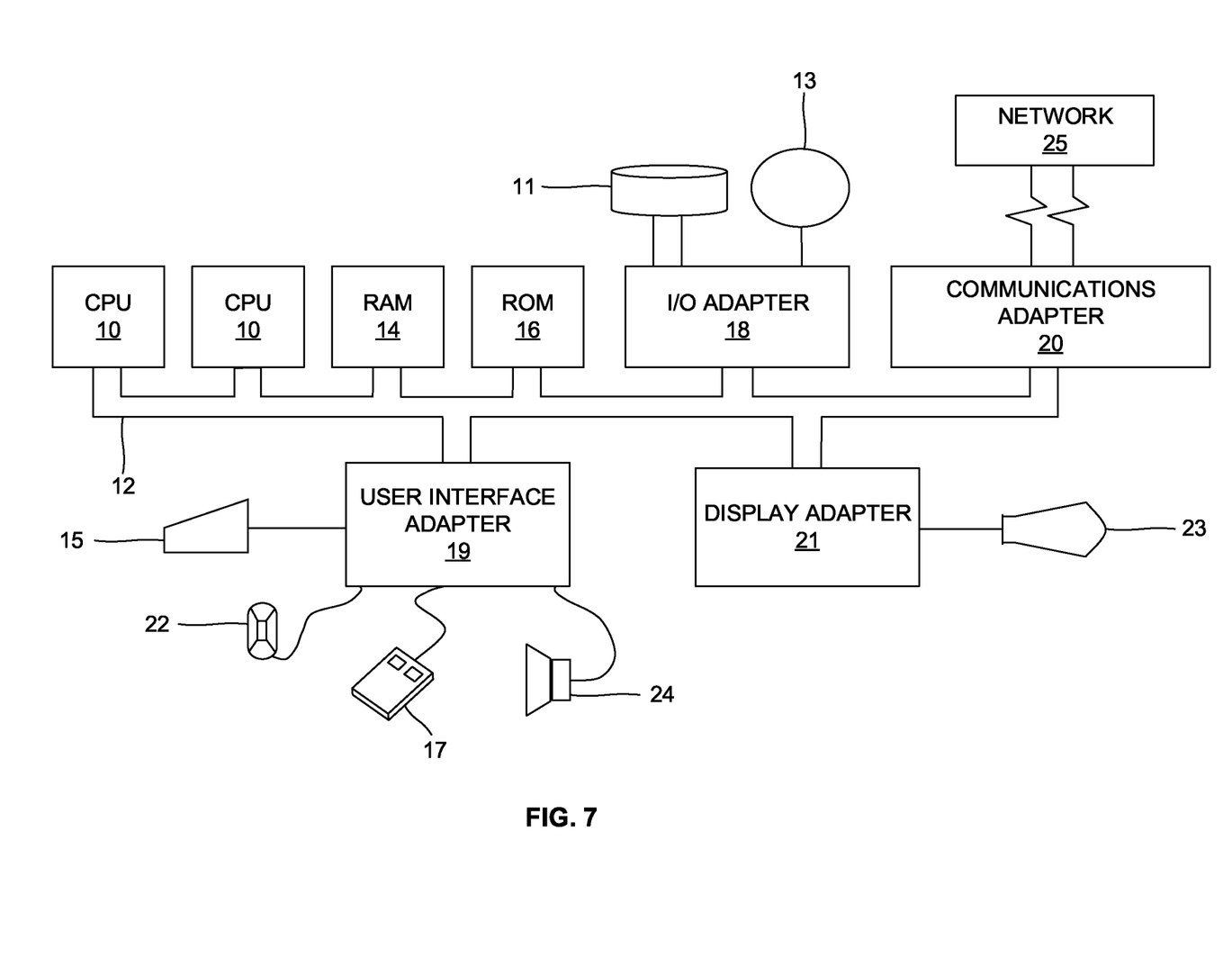
FIG. 7 illustrates a schematic view of a hardware configuration of device management/computer architecture according to an embodiment herein.

A representative hardware environment for practicing the embodiments herein is depicted in FIG. 7. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random-access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

We claim:

1. A method of enabling a cloud connector system (100) to establish a secure connection between on-premise devices and a cloud server (108) hosting a cloud Certificate Lifecycle Management as a Service (CLMaaS) for validating and upgrading a certificate on the on-premise devices, the method comprises:

implementing, a plurality of cloud connectors (102A-N) in a tenant premise comprising a plurality of on-premise devices (104A-N) to establish a full-duplex connection between the plurality of on-premise devices (104A-N) and the cloud Certificate Lifecycle Management as a Service (CLMaaS) hosted on the cloud server (108) with the plurality of cloud connectors (102A-N), wherein the plurality of cloud connectors (102A-N) are configured to accept requests related to certificate validation and upgradation from the cloud CLMaaS through a cloud connector proxy server and execute the requests in the plurality of on-premise devices (104A-N) on behalf of device communication layer of the cloud CLMaaS, wherein the plurality of cloud connectors (102A-N) are hosted with in a datacenter;

performing, a runtime analysis of the connection between the cloud server (108) and the plurality of cloud connectors (102A-N), wherein the runtime analysis of the connection is performed based on the number of requests received per minute from the cloud CLMaaS to the plurality of cloud connectors (102A-N);

routing, the requests from the cloud CLMaaS to the plurality of on-premise devices (104A-N) through the plurality of cloud connectors (102A-N) based on the runtime analysis of the connection, wherein a data center routes the requests between the plurality of cloud connectors (102A-N) based on the runtime analysis of the connection; and enabling the cloud connector system (100) to execute the certificate validation and upgradation in the on-premise devices based on the request from the cloud CLMaaS.

2. The method as claimed in claim 1, wherein the cloud connector system (100) routes the requests between the plurality of cloud connectors (102A-N) within the data center.

3. The method as claimed in claim 1, wherein the device communication layers communicate through common libraries comprising at least one of SSH connector, REST connector, SFTP connector, Email Connector.

4. The method as claimed in claim 1, wherein the cloud connector proxy server accepts requests from the device communication layers and routes the requests to the plurality of cloud connectors (102A-N).

5. The method as claimed in claim 1, wherein the plurality of cloud connectors (102A-N) employs mTLS and AES256 authentication to communicate with the plurality of on-premise devices (104A-N) and the cloud server (108).

6. The method as claimed in claim 1, wherein the plurality of cloud connectors (102A-N) run in an internal network of the plurality of on-premise devices (104A-N).

7. The method as claimed in claim 1, wherein each of the cloud connectors comprises a dedicated channel for communication with each of the on-premise devices.

8. The method as claimed in claim 1, wherein the runtime analysis of the connection provides a health status of the connection indicated as (i) "good" when the number of requests is $>=9$ out of 10, (ii) "poor" when the number of requests is $>=1$ out of 10, (iii) "failed" when the number of requests is 0 out of 10, wherein the health status of the plurality of cloud connectors (102A-N) are indicated as color codes.

9. The method as claimed in claim 1, wherein the method includes passing previously managed certificates in the cloud CLMaaS to the plurality of on-premise devices (104A-N) through the plurality of cloud connectors (102A-N) based on the runtime analysis of the connection.

10. A cloud connector system (100) for establishing a secure connection between on-premise devices and a cloud server (108) hosting a cloud Certificate Lifecycle Management as a Service (CLMaaS) for validating and upgrading a certificate on the on-premise devices, the system comprises:

a memory unit that stores a database and a set of instructions; and a processor that executes the set of instructions and is configured to:

implementing, a plurality of cloud connectors (102A-N) in a tenant premise comprising a plurality of on-premise devices (104A-N) to establish a full-duplex connection between a plurality of on-premise devices (104A-N) and the cloud Certificate Lifecycle Management as a Service (CLMaaS) hosted on the cloud server (108) with a plurality of cloud connectors (102A-N), wherein the plurality of cloud connectors (102A-N) are configured to accept requests related to certificate validation and upgradation from the cloud CLMaaS through a cloud connector proxy server and execute the requests in the plurality of on-premise devices (104A-N) on behalf of device communication layers of the cloud CLMaaS, wherein the plurality of cloud connectors (102A-N) are hosted with in a datacenter;

performing, a runtime analysis of the connection between the cloud server (108) and the plurality of cloud connectors (102A-N), wherein the runtime analysis of the connection is performed based on the number of requests received per minute from the cloud CLMaaS to the plurality of cloud connectors (102A-N);

routing, the requests from the cloud CLMaaS to the plurality of on-premise devices (104A-N) through the plurality of cloud connectors (102A-N) based on the runtime analysis of the connection, wherein the data center routes the requests between the plurality of cloud connectors (102A-N) within a datacenter based on the runtime analysis of the connection;

enabling the cloud connector system (100) to execute the certificate validation and upgradation in the on-premise devices based on the request from the cloud CLMaaS.

11. The cloud connector system (100) as claimed in claim 10, wherein the cloud connector system (100) routes the requests between the plurality of cloud connectors (102A-N) within the data center.

12. The cloud connector system (100) as claimed in claim 10, wherein the device communication layer communicate through common libraries comprising at least one of SSH connector, REST connector, SFTP connector, Email Connector.

13. The cloud connector system (100) as claimed in claim 10, wherein the cloud connector proxy server accepts requests from the device communication layers and routes the requests to the plurality of cloud connectors (102A-N).

14. The cloud connector system (100) as claimed in claim 10, wherein the plurality of cloud connectors (102A-N) employs mTLS and AES256 authentication to communicate with the plurality of on-premise devices (104A-N) and the cloud server (108).

15. The cloud connector system (100) as claimed in claim 10, wherein the plurality of cloud connectors (102A-N) run in an internal network of the plurality of on-premise devices (104A-N).

16. The cloud connector system (100) as claimed in claim 10, wherein each of the cloud connector comprises a dedicated channel for communication with each of the on-premise devices.

17. The cloud connector system (100) as claimed in claim 10, wherein the runtime analysis of the connection provides a health status of the connection indicated as (i) "good" when the number of requests is $>=9$ out of 10, (ii) "poor" when the number of requests is $>=1$ out of 10, (iii) "failed" when the number of requests is 0 out of 10, wherein the health status of the plurality of cloud connectors (102A-N) are indicated as color codes.

18. A one or more non-transitory computer-readable storage mediums storing the one or more sequences of instructions, which when executed by the one or more processors, causes to perform a method of enabling a cloud connector system (100) to establish a secure connection between on-premise devices and a cloud server (108) hosting a cloud Certificate Lifecycle Management as a Service (CLMaaS) for validating and upgrading a certificate on the on-premise devices, the method comprising: implementing, a plurality of cloud connectors (102A-N) in a tenant premise comprising a plurality of on-premise devices (104A-N) to establish a full-duplex connection between the plurality of on-premise devices (104A-N) and the cloud Certificate Lifecycle Management as a Service (CLMaaS) hosted on the cloud server (108) with a plurality of cloud connectors (102A-N), wherein the plurality of cloud connectors (102A-N) are configured to accept requests related to certificate validation and upgradation from the cloud CLMaaS through a cloud connector proxy server and execute the requests in the plurality of on-premise devices (104A-N) on behalf of device communication layers of the cloud CLMaaS, wherein the plurality of cloud connectors (102A-N) are hosted within a datacenter; performing, a runtime analysis of the connection between the cloud server (108) and the plurality of cloud connectors (102A-N), wherein the runtime analysis is performed based on the number of requests received per minute from the cloud CLMaaS to the plurality of cloud connectors (102A-N); routing, the requests from the cloud CLMaaS to the plurality of on-premise devices (104A-N) through the plurality of cloud connectors (102A-N) based on the runtime analysis of the connection, wherein the data center routes the requests between the plurality of cloud connectors (102A-N) within a datacenter based on the runtime analysis of the connection; and enabling the cloud connector system (100) to execute the certificate validation and upgradation in the on-premise devices based on the request from the cloud CLMaaS.

* * * * *